(12) United States Patent
Horstmann

(10) Patent No.: US 6,285,985 B1
(45) Date of Patent: *Sep. 4, 2001

(54) ADVERTISING-SUBSIDIZED AND ADVERTISING-ENABLED SOFTWARE

(75) Inventor: Cay Horstmann, Cupertino, CA (US)

(73) Assignee: Preview Systems, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 25 days.

(21) Appl. No.: 09/053,949

(22) Filed: Apr. 3, 1998

(51) Int. Cl.$^7$ ..................................................... G06F 17/60
(52) U.S. Cl. ................................ 705/14; 705/26; 705/27; 707/500; 707/511; 707/513
(58) Field of Search ................................. 705/14, 26, 27; 707/511, 513, 500

(56) References Cited

U.S. PATENT DOCUMENTS

| | | | |
|---|---|---|---|
| 5,036,314 | * | 7/1991 | Barillari et al. ........................... 345/2 |
| 5,105,184 | * | 4/1992 | Pirani et al. ........................... 340/721 |
| 5,347,632 | | 9/1994 | Filepp et al. ........................... 395/200 |
| 5,643,088 | * | 7/1997 | Vaughn et al. ........................... 463/40 |

(List continued on next page.)

OTHER PUBLICATIONS

Broadvision Uses its On–line Marketing Database to Deliver Personalised World Wide Web Sites, Computergarm International, Mar. 21, 1996.*

GeoCities Partners with StarPoint to Serve millions of Personalized Ads Daily, PR News Wire, Jul. 21, 1997.*

(List continued on next page.)

Primary Examiner—Vincent Millin
Assistant Examiner—Jagdish N Patel
(74) Attorney, Agent, or Firm—Burns Doane Swecker & Mathis LLP

(57) ABSTRACT

The present invention, generally speaking, provides a mechanism allowing a software developer to present advertisements through a software program. In accordance with an exemplary embodiment of the invention, an advertisement module is attached to the software program. The function of the advertisement module is to retrieve advertisements from an advertisement server and to display them to the user. The advertisements are varied to retain the interest of the user. Furthermore, information about the user may be sent to the advertisement server, allowing advertisements to be targeted to the user. Such information may include the category of the software program and the user's usage of the software program, for example. Associated with the ad server are a rules engine and a usage database. Various policies may be controlled by the software developer as well as the operator of the ad server, including the nature of information to be sent to the advertisement server, whether connection will be scheduled or will occur "opportunistically" in conjunction with user-initiated Internet access, whether prolonged inability to connect will result in use of the software being disallowed, etc. When the user clicks on the ad being displayed, the ad module may cause various actions to be taken. For example, a Web browser on the user's machine may be started up and pointed to a location providing further information about the subject matter of the ad. Alternatively, the ad module may simply show a new ad in the ad screen The new add could be a repeat of an already downloaded ad (with repeat count and frequency specified by instructions accompanying the ad) or it could be a freshly downloaded ad. The usage database associated with the ad server is used to compute billing to advertisers, provide for auditing of circulation, etc. Click-through rewards may be provided for in which the software publisher is paid each time a user expresses interest in an ad carried by a software program of the software publisher by clicking through the ad.

14 Claims, 3 Drawing Sheets

U.S. PATENT DOCUMENTS

| | | | |
|---|---|---|---|
| 5,721,827 | | 2/1998 | Logan et al. .................... 395/200.47 |
| 5,724,521 | * | 3/1998 | Dedrick ................................... 705/26 |
| 5,740,549 | * | 4/1998 | Reilly et al. ........................... 705/14 |
| 5,835,087 | * | 11/1998 | Herz et al. ............................ 345/327 |
| 5,835,923 | | 11/1998 | Shibata et al. ........................ 707/526 |
| 5,848,396 | | 12/1998 | Gerace ................................... 705/10 |
| 5,848,397 | | 12/1998 | Marsh et al. ........................... 705/14 |
| 5,878,421 | * | 3/1999 | Ferrel et al. .......................... 707/100 |
| 5,913,040 | * | 6/1999 | Rakavy et al. ........................ 370/229 |
| 5,933,811 | * | 8/1999 | Angles et al. ......................... 705/14 |
| 5,946,664 | * | 8/1999 | Ebisawa ................................. 705/14 |
| 6,009,525 | * | 12/1999 | Horstmann ........................... 713/200 |

OTHER PUBLICATIONS

Poppe Tyson Partners with Atlanta Software Leader to form Doubleclick—The First Advertising Network for The Internet, PR Newswire, Feb. 5, 1996.*

Broadvision Introduces The Angle. The First Web Site with a Brain. Yours., Business Wire, Sep. 3, 1996.*

Personalized Marketing and Selling on the Internet Unleashed by Broadvision.. Business Wire Jan. 22, 1996.*

* cited by examiner

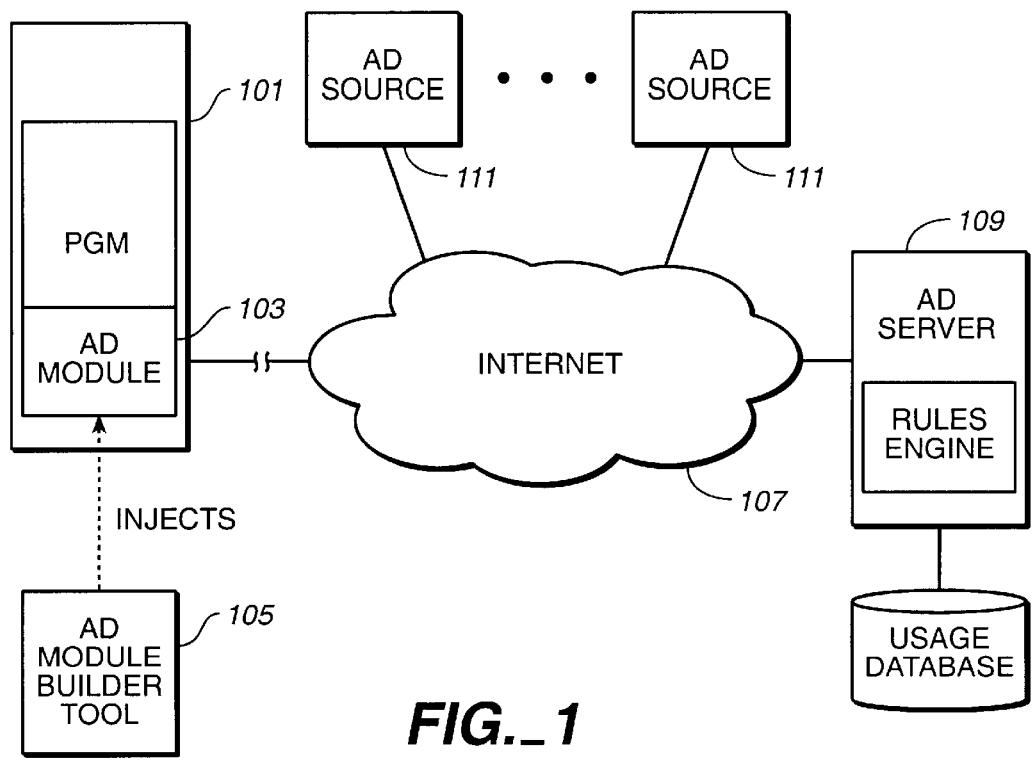
FIG._1
CONNECTION
 URL:
  • USER INITIATED
  • SCHEDULED
   INTERVAL
    ☐ HOURS  ☐ MINUTES
TARGET INFORMATION
  • USER NAME
  • DEVELOPER, PRODUCT NAME, CATEGORY
  • PRODUCT USAGE
  • HOST INSTALLATION (PLATFORM, INSTALLED PRODUCTS)
MINIMUM SUCCESS
  • NO MINIMUM
    ☐ OF   ☐ ATTEMPTS
FIG._4

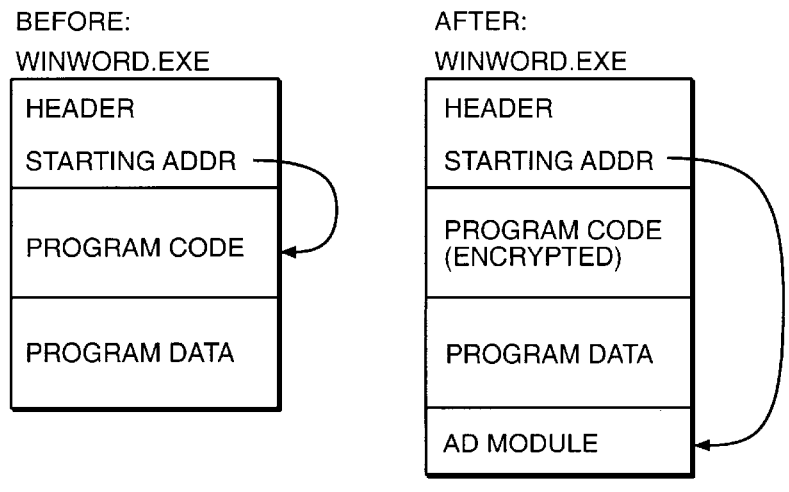
FIG._2
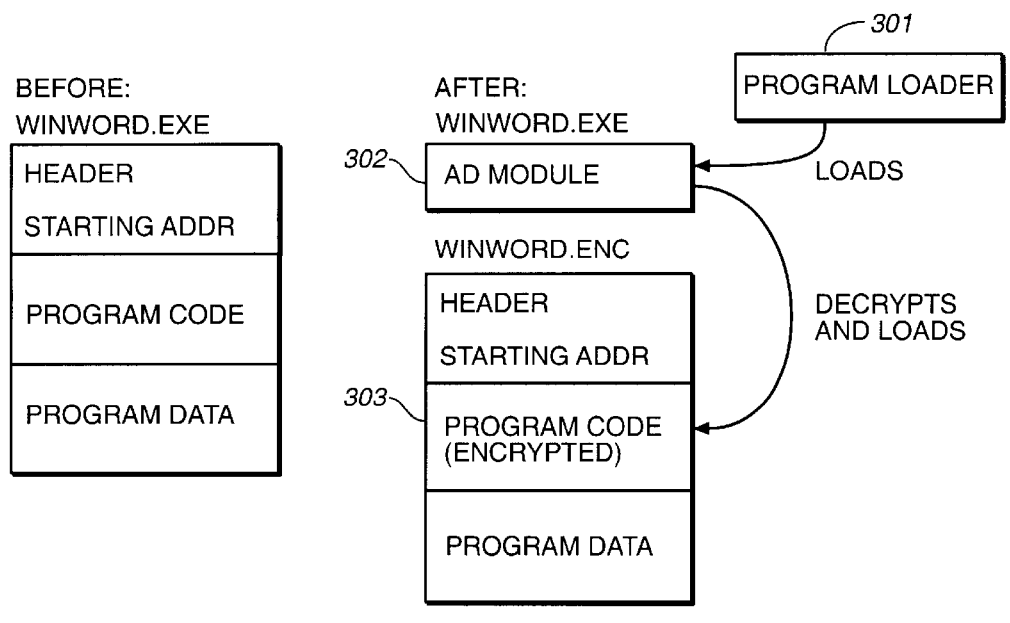
FIG._3

THIS SOFTWARE RELIES ON THE ABILITY TO CONNECT TO THE INTERNET PERIODICALLY IN ORDER TO OPERATE AS INTENDED. PLEASE CHECK TO MAKE SURE THAT THE SOFTWARE WILL BE ABLE TO CONNECT.
FIG._5
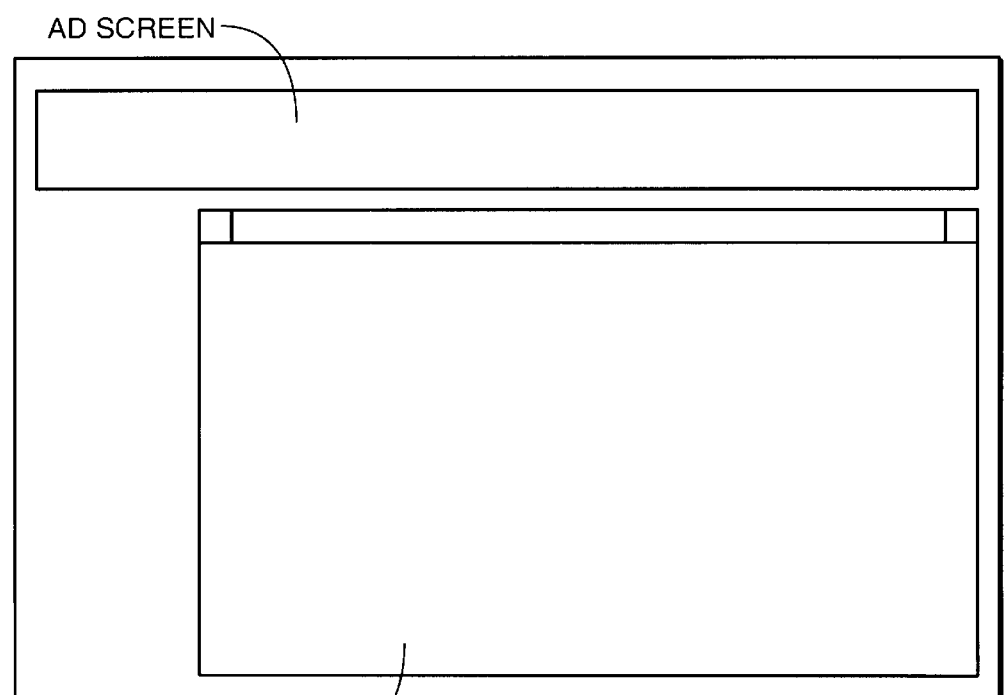
FIG._6

ADVERTISING-SUBSIDIZED AND ADVERTISING-ENABLED SOFTWARE

BACKGROUND OF THE INVENTION

1. Field of the Invention

The present invention relates to electronic advertising, particularly the use of "banner ads."

2. State of the Art

Digital convergence has resulted in an increasing blurring of distinctions between computing and broadcast media, a notable example of which is Internet TV, i.e., equipment and services that provide for Internet access using a TV screen as the display. Broadcast media are often subsidized by advertising and provided free-of-charge to the consumer. A similar trend has emerged in the Internet arena. Internet directories and search engines may be used free-of-charge, however, advertisements are prominently displayed at nearly every turn.

Another example of this trend is the Pointcast™ Network, in which a piece of software installed on a user's machine automatically connects to the Internet and grabs news that the user wants directly off the Internet to create customized desktop news pages daily, hourly, or as often as the user wants. The news pages are displayed along with advertisements.

In contrast to advertisement-subsidized software, there is also a considerable body of "freeware," software that can be freely distributed. If a user finds the software especially useful or enjoyable, the user may be encouraged to make nominal payment to the author of the software.

Despite the foregoing trends, most "mainstream" software is purchased (or, more accurately, licensed), with the price typically ranging from several tens of dollars to many thousands of dollars depending on the software program. No mechanism exists that would allow a software developer to produce an advertisement-subsidized version of a software program without extensive source code changes.

Using the Internet to transmit selected advertisements or other information in background mode to a local computer is known. One such system is described in patent publication WO 9707656 entitled METHOD AND APPRATATUS FOR TRANSMITTING AND DISPLAYING INFORMATION BETWEEN A REMOTE NETWORK AND A LOCAL COMPUTER, published Mar. 6, 1997, and incorporated herein by reference. In the foregoing system, the selection of what advertisements or other information to transmit to a particular user is based on user-defined preference. Such a system suffers from certain disadvantages. For example, to correctly anticipate what information should be sought from users is difficult. If a need or desire for additional user information become apparent, it is necessary to have user update their preferences. This cycle of recognizing a need for further user information and requesting users to update their preferences may occur repeatedly. Hence, although data transfer may occur in background mode, operation of the system is quite visible—and quite possibly distracting—to users.

Furthermore, the foregoing patent relates to a system in which the acquisition and display of the advertisements is carried out by a program that has been created expressly for the purpose of presenting the advertisements and information to the user rather than in a program that the user is intrinsically interested in operating. The disadvantage of this approach is that a computer user may not find the program compelling enough to allow it to operate on the user's computer.

SUMMARY OF THE INVENTION

The present invention, generally speaking, provides a mechanism allowing a software developer to present advertisements through a software program. In accordance with an exemplary embodiment of the invention, an advertisement module is attached to the software program. The function of the advertisement module is to retrieve advertisements from an advertisement server and to display them to the user. The advertisements are varied to retain the interest of the user. Furthermore, information about the user may be sent to the advertisement server, allowing advertisements to be targeted to the user. Such information may include the category of the software program and the user's usage of the software program, for example. Associated with the ad server are a rules engine and a usage database. Various policies may be controlled by the software developer as well as the operator of the ad server, including the nature of information to be sent to the advertisement server, whether connection will be scheduled or will occur "opportunistically" in conjunction with user-initiated Internet access, whether prolonged inability to connect will result in use of the software being disallowed, etc. When the user clicks on the ad being displayed, the ad module may cause various actions to be taken. For example, a Web browser on the user's machine may be started up and pointed to a location providing further information about the subject matter of the ad. Alternatively, the ad module may simply show a new ad in the ad screen The new add could be a repeat of an already downloaded ad (with repeat count and frequency specified by instructions accompanying the ad) or it could be a freshly downloaded ad. The usage database associated with the ad server is used to compute billing to advertisers, provide for auditing of circulation, etc. Click-through rewards may be provided for in which the software publisher is paid each time a user expresses interest in an ad carried by a software program of the software publisher by clicking through the ad.

BRIEF DESCRIPTION OF THE DRAWING

The present invention may be further understood from the following description in conjunction with the appended drawing. In the drawing:

FIG. 1 is a block diagram of a computing environment in which the present invention may be used;

FIG. 2 is a diagram illustrating a first method of adding an advertisement module to an existing application program;

FIG. 3 is a diagram illustrating a second method of adding an advertisement module to an existing application program;

FIG. 4 is a diagram of a configuration screen display of the Advertisement Builder Tool of FIG. 1;

FIG. 5 is a diagram of a screen display used in one embodiment of the invention; and FIG. 6 is a diagram of a screen layout providing an ad screen.

DETAILED DESCRIPTION OF THE PREFERRED EMBODIMENTS

Referring now to FIG. 1, a block diagram is shown of a computing environment in which the present invention may be used. A user machine 101 has installed a program, the program having attached thereto an ad module 103. The program may be any arbitrary program. The ad module is attached to the program using an Ad Module Builder Tool 105. Preferably, the Ad Module Builder Tool allows a software developer to attach the ad module to a program on-site in a simple, straight-forward manner without source code changes.

The function of the ad module is to retrieve and display to the user of the program various advertisements. In one embodiment, advertisements are retrieved over the Internet (107) from an ad server 109. The ad server may in turn retrieve ads from various ad sources 111.

Attachment of the ad module to the program executable may be accomplished by "code injection" or by other alternative mechanisms. Referring to FIG. 2, in the code injection approach, attachment is achieved by: 1) optionally encrypting the program code; 2) adding the ad module to the program executable; and 3) changing the starting address pointer within the application header to point to, instead of beginning of the program code, the beginning of the ad module. Encrypting the program code in such a way that requires the ad module to decrypt it protects against the ad module being "stripped out." Referring to FIG. 3, in an alternative approach, the program code (303) is encrypted and ad module code (302) is provided apart from the original executable. A program loader (301) starts out by executing the ad module. The ad module is responsible for decrypting and loading the original program. The chief difference between the two methods is that, in the sfcond method, the ad module is in a separate file, rather than attached to the executable.

An alternative approach for monitoring the user of an application without requiring source code changes is described in U.S. patent application Ser. No. 09/041,315, INTERACTIVE CUSTOMER SUPPORT FOR COMPUTER PROGRAMS USING NETWORK CONNECTON OF USER MACHINE, filed Mar. 12, 1998, incorporated herein by reference. In that approach, an application-independent agent is used to monitor application usage. Such an agent can be used to perform the functions of the present advertising module, provided that some provision is made to ensure the presence of the agent if the software vendor requires the receipt of advertisements as a condition of software use. Such assurance could be provided by a simple check in the advertising-enabled software, such check being either programmed by the software vendor or "injected" without requiring source code changes.

In a preferred embodiment of the advertising-enabled technology, the packaging and installation process strives to avoid code duplication on the computer onto which the advertising-enabled programs are installed, by organizing some of the advertising functionality into separate code modules that can be shared by advertising-enabled programs, and by installing only those code modules that are not already present on the user machine.

The ad module may operate in any of various fashions. The ad module may display an advertisement at start-up only, allowing the user to click a button to close the ad and launch the application. As shown in FIG. 6, the ad module may display a permanent ad screen within which the advertisement is periodically varied. Alternatively, the ad module may interrupt work flow every so often to display an ad.

The ad module, when it is connected to the ad server, may cache a collection of advertisements for display between connections. Connections may be forced or "opportunistic." In the latter case, the ad module takes advantage of idle time during an Internet connection to access the ad server.

Preferably, the ad module sends "user profile" information to the ad server such that ads targeted to the user based on the user profile may be downloaded and displayed. The user profile information may range from very simple static information to more extensive dynamic information. Such information may include the category of the software program and the user's usage of the software program, for example. If a user makes extensive use of an investments portion of a financial program, for example, this use may be reflected in the user profile with the result that advertisements for investment products are retrieved and displayed. A payment system may compensate the software publisher on a "per-hit" basis. That is, each time a particular advertisement is downloaded, the advertiser may pay some nominal amount to the software publisher.

Alternatively, the payment scheme may be based on a one-time fee, or may be based on "referrals." In the latter instance, the user expresses interest in ad advertisement by clicking on it. The ad module detects the click and activates a local Web browser, causing a Web page related to the advertisement to be accessed. The Web page may, for example, be a form that may be submitted by the user to request further information.

Referring again to FIG. 1, the ad server includes a rules engine and is also connected to a usage database. The usage database remembers user identities and profiles, and remembers what ads were sent to each user. The rules engine uses the latter information to avoid or manage repetition (some repetition may actually be desirable). The usage database also remembers what ads were click on. This information is used to compute billing to advertisers, allow for auditing of circulation, etc.

Preferably, the Ad Module Builder Tool guides a software developer through various options pertaining to operation of the ad module. A simplified example of a screen display used to prompt the software developer is shown in FIG. 4. The software developer is prompted to select connection options, target information (user profile) options, and, if desired, to specify a minimum acceptable measure of success of the ad module in retrieving and displaying ads in order for the ad module to allow continued use of the program. Ads may: (1) be displayed in a reserved area of the screen; (2) periodically pop-up in front of the application; (3) periodically take over the entire screen, interrupting usage of the application program, etc.

Alternatively, the configuration of the advertising that occurs in a particular software program can occur through an interface (for example a Web form) to the rules engine. The advertising-enabled application fetches configuration files in a manner that is similar to the fetching of the actual advertisements and then configures its behavior dynamically.

In the illustrated example, under Connection options, the developer specifies a URL of the ad server and selects whether connection is to be user initiated or scheduled. If connection is user initiated, then the ad module only connection to the ad server to retrieve ads when the user has connected to the Internet for some other purpose (i.e., get or send email, browse the Web, etc.). The ad server may retrieve multiple ads at a single time for display over a period of time. If connection is scheduled, then the ad module forces the operating system to connect to the Internet and establish a connection to the ad server at intervals during use of the software program. The developer may specify the interval to be on the quarter hour, hourly, or any desired interval.

The target information may include such information as the user name, developer, the product name and product category, product usage, host installation (platform, products), etc.

The developer may allow the program to be used regardless of the success of the ad module, or may specify some minimum level of success. For example, the developer may require that the ad module succeed 5 times out of every 10 attempts to access the ad server, or 50 times out of 100, or any other proportion.

If the developer specifies some minimum level of success then, during operation, if the ad module finds itself unable to connect, it may display a message as shown in FIG. 5, for example, informing or reminding the user that the software relies on the ability to connect to the Internet periodically in order to operate as intended. If thereafter the ad module is unable to achieve the specified level of connection success, it may display a message informing the user that the software is unable to connect and is therefore quitting.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A method of electronic advertisement in which an advertising module interacts with an executable pre-existing software program without requiring substantial source code modifications of the software program, the method comprising the steps of:
    adding the advertisement module to the software program using an object code attachment technique in which the software program remains unaware of the advertising module;
    installing and launching by a user the software program on an end-user machine;
    connecting by the advertising module in response to the launching of the software program to a remote advertisement server;
    receiving at least one electronic advertisement by the advertising module; and
    displaying the advertisement to the user.

2. The method of claim 1, wherein an advertisement is displayed to the user at least occasionally, but during at least certain other times, no advertisement is displayed.

3. The method of claim 1, wherein a sequence of advertisements is displayed substantially throughout use of the software program.

4. The method of claim 1, wherein an advertisement is displayed at periodic intervals.

5. The method of claim 1, comprising the further step of injecting the advertisement module into the software program using a software tool.

6. The method of claim 1, comprising the further steps of:
    sending information about a user to the advertisement server; and
    selecting advertisements targeted to the user based on said information.

7. The method of claim 6, wherein said information relates to a program category of the software program.

8. The method of claim 6, wherein said information relates to a usage pattern of the software program by the user.

9. The method of claim 6, comprising the further step of a software developer, using a software tool, selecting policies affecting operation of the advertisement module.

10. The method of claim 9, wherein said policies determine whether connection is scheduled or opportunistic.

11. The method of claim 9, wherein said policies determine what information is sent to the advertisement server.

12. The method of claim 9, wherein said policies determine whether usage of the program is restricted in relation to the ability of the advertisement module to connect to the advertisement server.

13. The method of claim 9, comprising the further step of including with an advertisement information concerning the frequency and timing with which the advertisement is to be presented.

14. The method of claim 1, comprising the further steps of:
    a user clicking on said advertisement; and
    causing further advertisement-related information to be displayed.

* * * * *